United States Patent
Hwang et al.

(10) Patent No.: US 11,561,639 B2
(45) Date of Patent: Jan. 24, 2023

(54) DISPLAY DEVICE AND CONTROL METHOD FOR PERFORMING OPERATIONS RELATING TO USER INPUT AND DISPLAY STATE

(71) Applicant: SAMSUNG ELECTRONICS CO., LTD., Suwon-si (KR)

(72) Inventors: Woo-seok Hwang, Seoul (KR); Kyung-jin Kim, Seoul (KR); Mi-ra Yu, Seoul (KR); Jean Christophe Naour, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/756,353

(22) PCT Filed: Jul. 13, 2018

(86) PCT No.: PCT/KR2018/007935
§ 371 (c)(1),
(2) Date: Apr. 15, 2020

(87) PCT Pub. No.: WO2019/093618
PCT Pub. Date: May 16, 2019

(65) Prior Publication Data
US 2021/0200371 A1    Jul. 1, 2021

(30) Foreign Application Priority Data

Nov. 13, 2017 (KR) .......................... 10-2017-0150605

(51) Int. Cl.
*G06F 3/0482* (2013.01)
*G06F 3/041* (2006.01)
(Continued)

(52) U.S. Cl.
CPC .......... *G06F 3/0416* (2013.01); *G06F 3/0346* (2013.01); *G06F 3/0482* (2013.01);
(Continued)

(58) Field of Classification Search
None
See application file for complete search history.

(56) References Cited

U.S. PATENT DOCUMENTS 6,538,665 B2 * 3/2003 Crow ...................... G06F 3/048
715/723
7,088,342 B2 * 8/2006 Rekimoto ............. G06F 1/1626
345/169

(Continued)

FOREIGN PATENT DOCUMENTS

KR    10-2010-0027686    3/2010
KR    10-2013-0099696    9/2013
(Continued)

OTHER PUBLICATIONS

International Search Report for PCT/KR2018/007935 dated Nov. 15, 2018, 5 pages.
(Continued)

*Primary Examiner* — Tuyetlien T Tran
(74) *Attorney, Agent, or Firm* — Nixon & Vanderhye, P.C.

(57) ABSTRACT

Disclosed are a display apparatus, a control method thereof, and a computer control program product, the display apparatus including: a display configured to display a screen; a touch receiver configured to receive a user touch input; a sensor configured to detect a state of the display apparatus or surrounding states of the display apparatus; and a processor configured to perform a first operation based on a first touch input of a user, and control a second operation different from the first operation to be performed based on
(Continued)

a second touch input made by the user or the state detected by the sensor during reception of the first touch input.

9 Claims, 20 Drawing Sheets

(51) Int. Cl.
 G06F 3/0346 (2013.01)
 G06F 3/0488 (2022.01)
 G06F 3/04847 (2022.01)
 G06F 3/0485 (2022.01)
 G06F 3/04883 (2022.01)
 G06F 3/01 (2006.01)

(52) U.S. Cl.
 CPC .......... *G06F 3/0485* (2013.01); *G06F 3/0488* (2013.01); *G06F 3/04847* (2013.01); *G06F 3/04883* (2013.01); *G06F 3/011* (2013.01); *G06F 3/017* (2013.01)

(56) References Cited

U.S. PATENT DOCUMENTS

| | | | | |
|---|---|---|---|---|
| 7,348,967 | B2* | 3/2008 | Zadesky | G06F 1/1626 345/156 |
| 7,800,592 | B2* | 9/2010 | Kerr | G06F 1/1626 345/173 |
| 8,261,207 | B2* | 9/2012 | Hawkins | H04M 1/27475 715/810 |
| 8,312,371 | B2* | 11/2012 | Ording | G06F 3/0482 715/700 |
| 8,368,723 | B1* | 2/2013 | Gossweiler, III | G06K 9/00261 345/660 |
| 8,378,985 | B2* | 2/2013 | Thorn | G06F 1/169 345/173 |
| 8,467,839 | B2* | 6/2013 | Rema Shanmugam | H04M 1/0237 455/575.4 |
| 8,522,157 | B2* | 8/2013 | Park | G06F 3/0482 715/786 |
| 8,654,095 | B1* | 2/2014 | Cho | G06F 1/1641 345/173 |
| 8,726,194 | B2* | 5/2014 | Hildreth | G06F 3/0236 715/859 |
| 8,775,966 | B2* | 7/2014 | Stolyarov | G06F 1/1626 715/784 |
| 8,803,820 | B2* | 8/2014 | Suzuki | G06F 3/044 345/173 |
| 8,847,436 | B2* | 9/2014 | Maxik | H05B 47/10 307/104 |
| 8,933,892 | B2* | 1/2015 | Woolley | G06F 3/04883 345/173 |
| 9,207,861 | B2* | 12/2015 | Gan | G06F 3/0346 |
| 9,367,279 | B2* | 6/2016 | Kim | G06F 3/1423 |
| 9,448,587 | B2* | 9/2016 | Park | G06F 3/04886 |
| 9,569,088 | B2* | 2/2017 | Kwak | G06F 3/0485 |
| 9,594,405 | B2* | 3/2017 | Papakipos | G06F 3/0485 |
| 9,792,037 | B2* | 10/2017 | Monteux | G06F 3/0483 |
| 9,817,546 | B2* | 11/2017 | Shin | H04M 1/72469 |
| 9,939,951 | B2* | 4/2018 | Luo | G06F 3/0412 |
| 9,973,620 | B2* | 5/2018 | Baek | H04B 1/3888 |
| 10,261,589 | B2* | 4/2019 | Sakai | G06F 3/017 |
| 10,296,127 | B2* | 5/2019 | Yun | G06F 3/0488 |
| 10,509,530 | B2* | 12/2019 | Chung | G06F 3/04886 |
| 10,514,796 | B2* | 12/2019 | Satake | G06F 1/169 |
| 10,627,947 | B2* | 4/2020 | Kono | G06F 1/1692 |
| 10,628,012 | B2* | 4/2020 | Oh | G06F 3/04883 |
| 10,845,914 | B2* | 11/2020 | Kono | G06F 3/045 |
| 10,891,005 | B2* | 1/2021 | Bae | G06F 3/04886 |
| 10,963,156 | B2* | 3/2021 | Han | G06F 3/013 |
| 2006/0187212 | A1* | 8/2006 | Park | G06F 1/1616 345/169 |
| 2006/0197750 | A1* | 9/2006 | Kerr | G06F 1/1626 345/173 |
| 2006/0238517 | A1* | 10/2006 | King | G06F 1/1643 345/173 |
| 2009/0070711 | A1* | 3/2009 | Kwak | G06F 3/0488 715/829 |
| 2009/0280868 | A1* | 11/2009 | Hawkins | H04M 1/72403 455/566 |
| 2010/0056221 | A1* | 3/2010 | Park | G06F 3/04855 455/566 |
| 2011/0096011 | A1* | 4/2011 | Suzuki | G06F 3/0418 345/173 |
| 2011/0163986 | A1* | 7/2011 | Lee | G06F 1/1692 345/173 |
| 2011/0209088 | A1* | 8/2011 | Hinckley | G06F 3/0488 715/810 |
| 2011/0209097 | A1* | 8/2011 | Hinckley | G06F 3/04883 715/863 |
| 2011/0292268 | A1* | 12/2011 | Mann | B62D 1/046 348/333.01 |
| 2012/0062564 | A1* | 3/2012 | Miyashita | G06F 3/0481 345/419 |
| 2012/0162048 | A1* | 6/2012 | Mitsunaga | G06F 3/1423 345/1.3 |
| 2012/0304133 | A1* | 11/2012 | Nan | G06F 3/04883 715/863 |
| 2012/0306788 | A1* | 12/2012 | Chen | G06F 3/0482 345/173 |
| 2013/0007653 | A1* | 1/2013 | Stolyarov | G06F 3/04845 715/784 |
| 2013/0009890 | A1* | 1/2013 | Kwon | G06F 3/0484 345/173 |
| 2013/0033438 | A1* | 2/2013 | Monteux | G06F 3/04883 345/173 |
| 2013/0222286 | A1* | 8/2013 | Kang | G06F 3/0416 345/173 |
| 2013/0234982 | A1* | 9/2013 | Kang | G06F 3/0488 345/174 |
| 2013/0265284 | A1* | 10/2013 | Yun | G06F 3/0488 345/175 |
| 2013/0300668 | A1* | 11/2013 | Churikov | G06F 1/169 345/173 |
| 2013/0300697 | A1* | 11/2013 | Kim | G06F 1/1637 345/173 |
| 2013/0328793 | A1* | 12/2013 | Chowdhury | G06F 1/3265 345/173 |
| 2013/0344919 | A1* | 12/2013 | Kim | G06F 3/042 455/566 |
| 2014/0009415 | A1* | 1/2014 | Nishida | G06F 3/0416 345/173 |
| 2014/0019910 | A1* | 1/2014 | Kim | G06F 3/0482 715/810 |
| 2014/0043265 | A1* | 2/2014 | Chang | G06F 3/04883 345/173 |
| 2014/0043277 | A1* | 2/2014 | Saukko | G06F 3/0487 345/173 |
| 2014/0118271 | A1* | 5/2014 | Lee | G06F 1/3265 345/173 |
| 2014/0289668 | A1* | 9/2014 | Mavrody | G06F 3/0412 715/781 |
| 2014/0365927 | A1* | 12/2014 | Sakai | G06F 3/0484 715/764 |
| 2015/0015458 | A1* | 1/2015 | Cho | G06F 3/011 345/8 |
| 2015/0031347 | A1* | 1/2015 | Kim | H04M 1/72409 455/418 |
| 2015/0042588 | A1* | 2/2015 | Park | G06F 3/0486 345/173 |
| 2015/0062126 | A1* | 3/2015 | Lee | G06T 3/20 345/428 |
| 2015/0095826 | A1* | 4/2015 | Ahn | G06F 3/04847 345/173 |
| 2015/0145797 | A1* | 5/2015 | Corrion | G06F 3/0416 345/173 |
| 2015/0160849 | A1* | 6/2015 | Weiss | G06F 3/04883 345/174 |

(56) References Cited

U.S. PATENT DOCUMENTS

| | | | | |
|---|---|---|---|---|
| 2015/0301665 | A1* | 10/2015 | Kim | G06F 1/1647 345/173 |
| 2016/0026381 | A1* | 1/2016 | Kim | G06F 3/04886 715/761 |
| 2016/0044153 | A1* | 2/2016 | Kim | G06F 3/04886 455/418 |
| 2016/0062556 | A1* | 3/2016 | Chung | G06F 3/04847 345/173 |
| 2016/0070338 | A1* | 3/2016 | Kim | G06F 3/01 345/173 |
| 2016/0110093 | A1* | 4/2016 | S | G06F 3/04886 715/863 |
| 2016/0124633 | A1* | 5/2016 | Kim | G06F 3/0485 715/773 |
| 2016/0154559 | A1* | 6/2016 | Yu | G06F 3/04842 715/769 |
| 2016/0179207 | A1* | 6/2016 | DeMena | G06F 3/04883 715/765 |
| 2016/0205237 | A1* | 7/2016 | Baek | H04M 1/0245 455/575.8 |
| 2016/0255256 | A1* | 9/2016 | Oh | H04N 5/2254 348/376 |
| 2016/0291731 | A1* | 10/2016 | Liu | G06F 3/04842 |
| 2016/0371691 | A1* | 12/2016 | Kang | G06Q 20/352 |
| 2016/0378318 | A1* | 12/2016 | Tsuju | G06F 3/04847 715/835 |
| 2017/0038957 | A1 | 2/2017 | Feng et al. | |
| 2017/0285843 | A1* | 10/2017 | Roberts-Hoffman | G06F 3/0485 |
| 2018/0024727 | A1* | 1/2018 | Oh | H04M 1/236 715/798 |
| 2018/0095501 | A1* | 4/2018 | Lasyath | G06F 1/1643 |
| 2019/0179487 | A1* | 6/2019 | Kong | G06F 3/0416 |
| 2020/0249812 | A1* | 8/2020 | Han | G06F 3/013 |

FOREIGN PATENT DOCUMENTS

| | | |
|---|---|---|
| KR | 10-2014-0043522 | 4/2014 |
| KR | 10-1403025 | 6/2014 |
| KR | 10-1415184 | 7/2014 |
| KR | 10-1494810 | 2/2015 |
| KR | 10-2015-0067676 | 6/2015 |
| KR | 10-2015-0095540 | 8/2015 |
| KR | 10-2015-0121443 | 10/2015 |
| KR | 10-2016-0028338 | 3/2016 |
| KR | 10-2016-0089265 | 7/2016 |
| KR | 10-2016-0093499 | 8/2016 |
| KR | 10-1667735 | 10/2016 |
| KR | 10-1917692 | 11/2018 |

OTHER PUBLICATIONS

Written Opinion of the ISA for PCT/KR2018/007935 dated Nov. 15, 2018, 6 pages.

Office Action dated Nov. 23, 2021 in counterpart Korean Patent Application No. 10-2017-0150605 and partial English-language translation.

Office Action dated May 6, 2022 in counterpart Korean Patent Application No. 10-2017-0150605 and partial English-language translation.

Office Action dated Oct. 26, 2022 in counterpart Korean Patent Application No. 10-2017-0150605 and partial English-language translation.

* cited by examiner

DISPLAY DEVICE AND CONTROL METHOD FOR PERFORMING OPERATIONS RELATING TO USER INPUT AND DISPLAY STATE

This application is the U.S. national phase of International Application No. PCT/KR2018/007935 filed Jul. 13, 2018 which designated the U.S. and claims priority to Korean Patent Application No. 10-2017-0150605 filed Nov. 13, 2017, the entire contents of each of which are hereby incorporated by reference.

FIELD

The disclosure relates to a display apparatus and a control method thereof, and more particularly a display apparatus capable of performing operation based on a user input and a control method thereof.

DESCRIPTION OF RELATED ART

Recently, a display apparatus has performed various operations with regard to a user input. The user input may include an input based on a touch. In response to the user input based on the touch, the display apparatus may perform various operations.

The display apparatus performs various operations, but is inconvenient because many touches are required to carry out the operations. Further, when a user input is made but not intended, the display apparatus has to be prevented from performing an operation. In addition, there is a need of checking whether the display apparatus has performed an operation desired by a user.

The related arts have no ways to solve the foregoing problems. Accordingly, there are needed a method of performing an operation desired by a user based on the user's minimal user input and a method of preventing an operation undesired by the user from being performed.

SUMMARY

Accordingly, an aspect of the disclosure is to provide a display apparatus, a control method thereof and a computer program product, in which a user touch input is minimized when the display apparatus performs an operation based on the user touch input, an operation is not carried out when a user touch input is unintentionally made, and a user intuitively perceives whether an operation performed by the display apparatus is based on the user touch input.

According to an embodiment of the disclosure, there is provided a display apparatus comprising: a display configured to display a screen; a touch receiver configured to receive a user touch input; a sensor configured to detect a state of the display apparatus or surrounding states of the display apparatus; and a processor configured to: identify the state of the display apparatus based on information detected by the sensor, based on the user touch input, control a first operation corresponding to a preset first state to be performed based on the display apparatus being in the first state, and a second operation corresponding to a preset second state to be performed based on the display apparatus being in the second state.

The sensor is configured to detect a user position, and the processor is configured to perform the second operation based on a second user portion different from a first user position corresponding to the first operation.

The processor is configured to: display a user interface (UI) comprising a plurality of menus on a screen; move a highlight in the plurality of menus in a first direction, based on the first user position; and move the highlight in the plurality of menus in an opposite direction to the first direction, based on the second user position.

The sensor is configured to detect change in a posture of the display apparatus, and the processor is configured to perform the second operation based on a second posture different from a first posture of the display apparatus corresponding to the first operation.

The processor is configured to prevent the first operation from being performed based on the touch input, based on the detected states.

The sensor is configured to detect movement of the display apparatus, and the processor is configured to prevent the first operation from being performed based on the display apparatus being moved more than predetermined quantity.

The processor is configured to: display a UI on a screen; change the UI in a direction based on a first position, based on a first touch input corresponding to the first position on the screen; and change the UI in a direction based on a second position, based on the first touch input corresponding to the second position different from the first position on the screen.

According to another embodiment of the disclosure, there is provided a method of controlling a display apparatus, the method comprising: identifying a state of the display apparatus based on information detected by a sensor, based on a user touch input; performing a first operation corresponding to a preset first state, based on the display apparatus being in the first state; and performing a second operation corresponding to a preset second state, based on the display apparatus being in the second state.

Further comprising: detecting a user position; and performing a second operation based on a second user position different from a first user position corresponding to the first operation.

Further comprising: displaying a user interface (UI) comprising a plurality of menus on a display; moving a highlight in the plurality of menus in a first direction, based on the first user position; and moving the highlight in the plurality of menus in an opposite direction to the first direction, based on the second user position.

Further comprising: detecting change in a posture of the display apparatus; and performing the second operation based on a second posture different from a first posture of the display apparatus corresponding to the first operation.

Further comprising: preventing the first operation from being performed based on the user touch input, based on the detected states.

Further comprising: detecting movement of the display apparatus; and preventing the first operation from being performed based on the display apparatus being moved more than predetermined quantity.

Further comprising: displaying a UI on a screen; changing the UI in a direction based on a first position, based on a first touch input corresponding to the first position on the screen; and changing the UI in a direction based on a second position, based on the first touch input corresponding to the second position different from the first position on the screen.

According to another embodiment of the disclosure, there is provided a computer program product comprising: a memory configured to store an instruction; and a processor, the instruction controlling a first operation to be performed based on a first touch input of a user, and a second operation different from the first operation corresponding to the first touch input to be performed based on a state detected by a sensor during reception of the first touch input.

As described above, according to the disclosure, it is possible to minimize a user touch input to carry out an operation of a display apparatus.

Further, according to the disclosure, an operation is prevented from being performed when a user touch input is unintentionally is made.

Further, according to the disclosure, a user can intuitively perceive whether an operation performed by the display apparatus is based on the user touch input.

DETAILED DESCRIPTION OF EXAMPLE EMBODIMENTS

Figure 1:
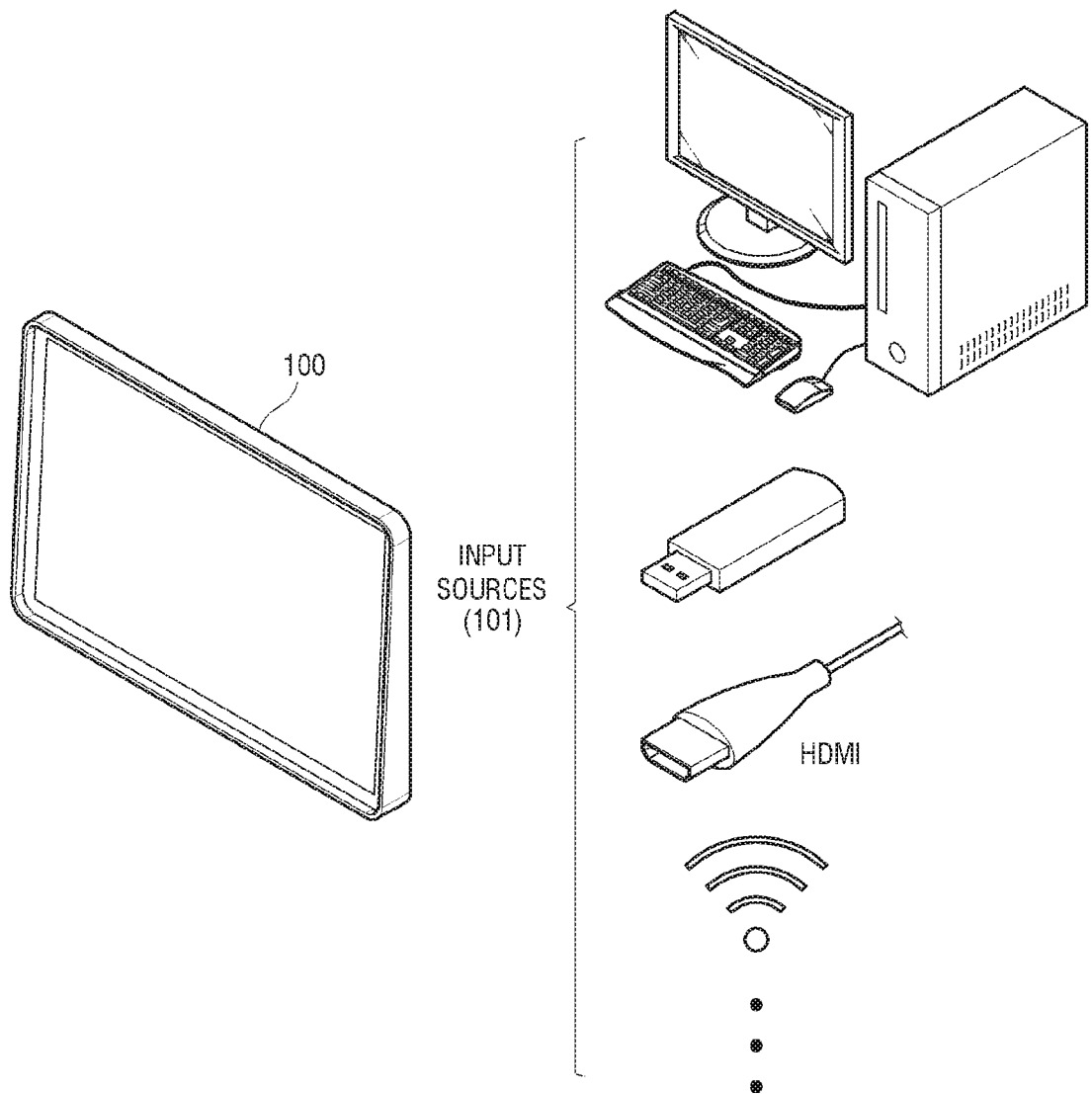
FIG. 1 illustrates a display apparatus according to an embodiment of the disclosure and input sources.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following embodiments. In the following descriptions, details about publicly known technologies or configurations may be omitted if they unnecessarily obscure the gist of the disclosure.

In the following embodiments, terms 'first', 'second', etc. are used only to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module for at least one processor.

FIG. 1 illustrates a display apparatus 100 according to an embodiment of the disclosure and input sources 101. The display apparatus 100 may receive content from the input sources 101 and execute the received content. The input sources 101 may include a computer, and any input sources 101 connectable by a universal serial bus (USB), a high definition multimedia interface (HDMI), and wired/wireless communication, etc. The content may include not only content received from the input sources 101, but also content stored in the display apparatus 100.

The display apparatus 100 is not limited to the type of the display apparatus 100 shown in FIG. 1, but may be embodied by another type. For example, the display apparatus 100 may include a monitor, a television (TV), an all-in-one personal computer (PC), a laptop PC, a tablet PC, a smartphone, etc. However, the embodiment of the disclosure is not limited to this example.

Figure 2:
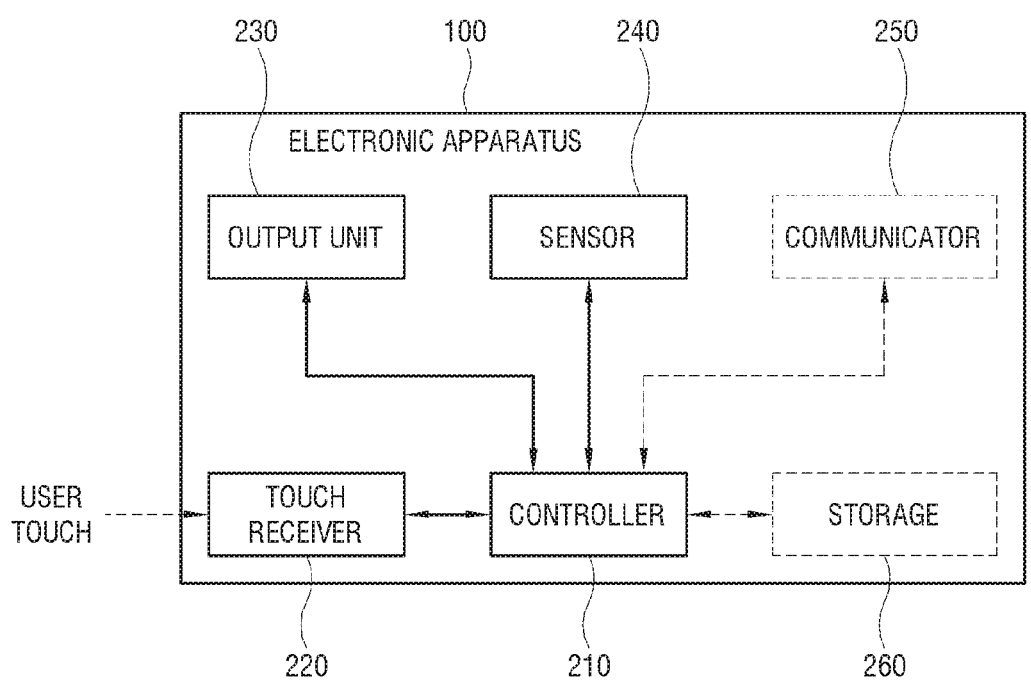
FIG. 2 is a block diagram of a display apparatus according to an embodiment of the disclosure.

FIG. 2 is a block diagram of a display apparatus 100 according to an embodiment of the disclosure. The display apparatus 100 according to an embodiment of the disclosure includes a controller 210, a touch receiver 220, an output unit 230, and a sensor 240. The display apparatus 100 may further include a communicator 250, and a storage 260.

However, the configuration of the display apparatus 100 shown in FIG. 2 is merely an example, and the display apparatus 100 according to an alternative embodiment of the disclosure may be achieved by other configurations than the configuration shown in FIG. 2. That is, the display apparatus 100 according to an embodiment of the disclosure may include another element in addition to the configuration shown in FIG. 2, or exclude a certain element from the configuration shown in FIG. 2.

Figure 3:
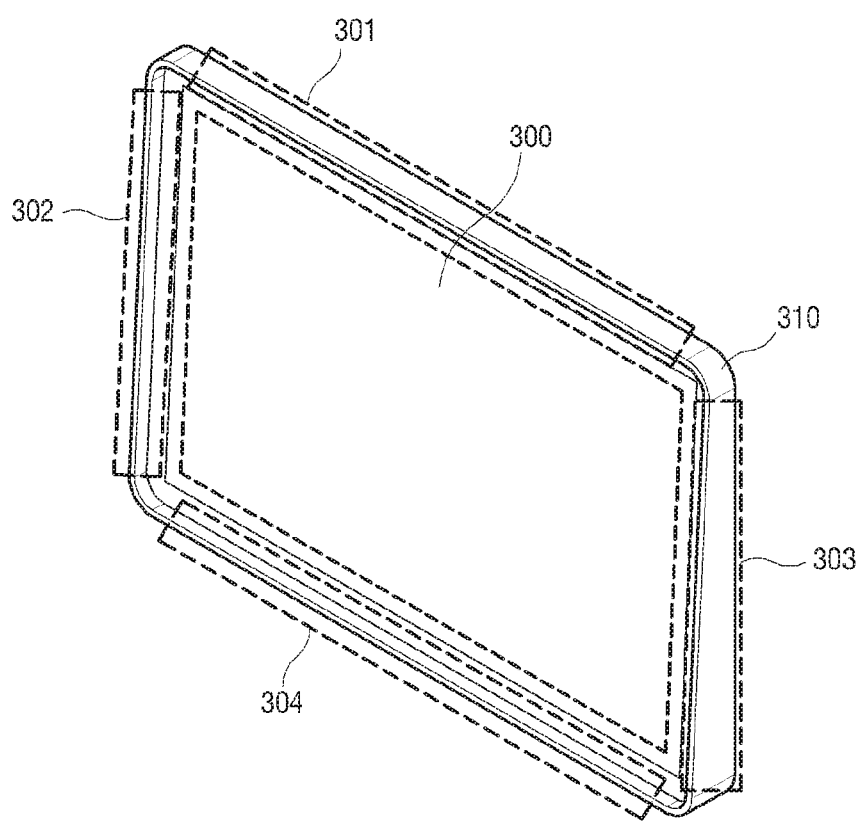
FIG. 3 illustrates a configuration of a display apparatus according to an embodiment of the disclosure.

The touch receiver 220 receives a user touch input. The touch receiver 220 may be provided at least a portion of a casing (see '310' in FIG. 3) of the display apparatus 100. FIG. 3 illustrates an example of the touch receiver 220 in the display apparatus 100 according to an embodiment of the disclosure. The touch receiver 220 may be provided in a top portion 301, lateral portions 302 and 303, and a bottom portion 304 in the casing 310 of the display apparatus 100. Therefore, a user can make a touch input various outer portions of the display apparatus 100. The touch receiver 220 may be exposed to the outside of the casing 310, or may be provided inside the casing 310. The touch receiver 220 may be provided as one device extended on a flat plate, or a plurality of touch receivers 220 may be provided in units of devices. The user touch input includes various touch inputs, and the kinds of touch inputs will be described later with reference to FIG. 4. Meanwhile, the position of the touch receiver 220 is not limited to the foregoing description, and the touch receiver 220 may receive a touch input at another portion of the display apparatus 100. For example, the touch receiver 220 may receive a user's touch through a screen of a display 300.

Referring back to FIG. 2, the output unit 230 outputs an execution result of content under control of the controller 210. The output unit 230 may include the display 300, a sound output unit, a vibrator, etc. The display apparatus 100 may for example include a loudspeaker in the bottom portion (see '620' in FIG. 6). However, the output unit 230 is not limited to this example, but may further include another kind of output unit. The content may be output as an image, a sound, a vibration or combination of them.

The display apparatus 100 includes a sensor 240 configured to detect the display apparatus's own state or its surrounding states. The sensor 240 of the display apparatus 100 may be embodied by various sensors of the display apparatus 100. The sensor 240 may include a visible light optical sensor, an infrared light optical sensor, an illumination sensor, an acoustic sensor, an acceleration sensor, a shock sensor, a position sensor, etc., but be not limited to these examples. The position of the sensor is not fixed, and the sensor may be provided at any position suitable for receiving an input corresponding to each sensor.

The sensor 240 may detect the posture of the display apparatus 100; how strong a shock applied to the display apparatus 100 is; how much the display apparatus 100 is tilted; how far the display apparatus 100 is moved; noise, brightness, etc. around the display apparatus 100; and so on. The controller 210 may control operations of the display apparatus 100 based on the state detected by the sensor 240.

Under control of the controller 210, the communicator 250 may perform communication with the input sources 101. A communication method may include both wired communication and wireless communication, and there are no limits to the communication method.

The storage 260 may be configured to store various pieces of information. Various pieces of information may include information related to operation implementation of the display apparatus 100 with regard to a user touch. Therefore, the operations of the display apparatus 100 may be set differently according to users with regard to the same user touch.

The controller 210 performs control for operating generating elements of the display apparatus 100. The controller 210 may include a control program (or instruction) for carrying out the foregoing control operation, a nonvolatile memory in which the control program is installed, a volatile memory to which at least a part of the installed control program is loaded, and at least one processor or central processing unit (CPU) for executing the loaded control program. Further, such a control program may be stored in other electronic apparatuses as well as the display apparatus 100. The control program may include a program(s) achieved in the form of at least one of a basis input/output system (BIOS), a device driver, an operating system, firmware, a platform, and an application program. According to an embodiment, the application program may be previously installed or stored in the electronic apparatus 100 when the display apparatus 100 is manufactured, or may be installed in the display apparatus 100 based on application program data received from the outside when needed in the future. The application program data may for example be downloaded from an application market or the like external server to the display apparatus 100. Such an external server is an example of a computer program product of the disclosure, but not limited to this example.

Figure 4:
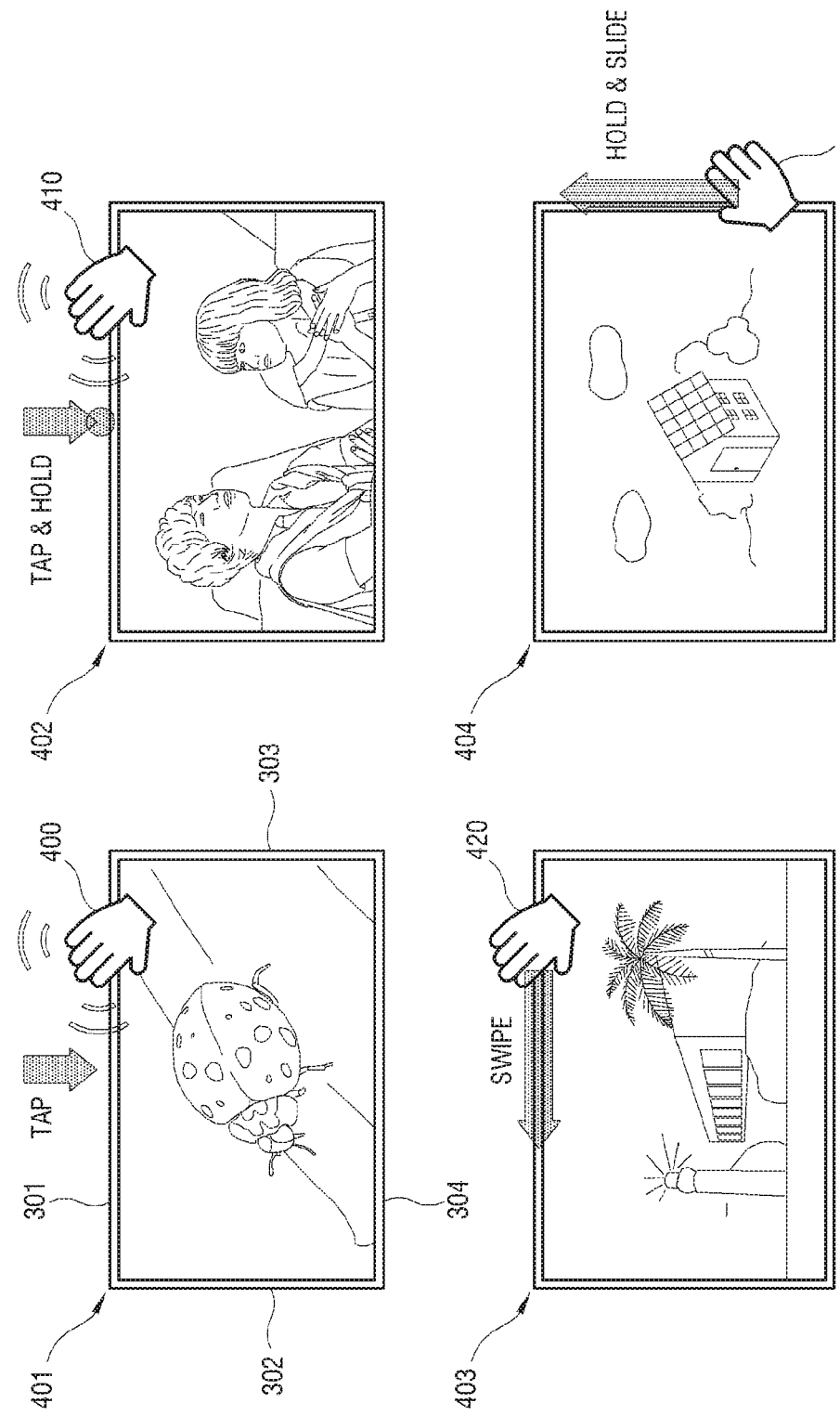
FIG. 4 illustrates an example of a user touch input according to an embodiment of the disclosure.

FIG. 4 illustrates the kind of touch inputs to the display apparatus 100 according to an embodiment of the disclosure. Below, four kinds of touch inputs will be described according to an embodiment of the disclosure. However, the embodiment of the disclosure is not limited to the four kinds of touch inputs, and there may be other touch inputs.

The display apparatus 100 receives a touch input in the casing 310 having the touch receiver 220. The four kinds of touch inputs are as follows: an action of hitting the casing 310 once (hereinafter, referred to as 'tap', 400), an action of tapping and continuing a touch (hereinafter, referred to as 'tap & hold', 410), an action of pushing like a wipe (hereinafter, referred to as 'swipe', 420), and an action of moving a contact portion after tap & hold (hereinafter, referred to as 'hold & slide', 430).

Although FIG. 4 does not illustrate that a touch input is made in the bottom portion 304, the touch input may be made in all the portions of the casing 310. Further, the casing 310 may be configured to receive any kind of touch input. Further, the kind of touch input is not limited to the four kinds of touch inputs described above. For instance, the kind of touch input may also include double tapping, and tapping made using both hands. For convenience of description, FIG. 4 illustrates a hand for making a touch input, but the touch input may be made without being limited to the hand.

Below, the controller 210 according to an embodiment of the disclosure will be described in detail. The controller 210 according to an embodiment of the disclosure controls an operation intended by a user to be performed considering current situations when a user touch input is received.

Figure 5:
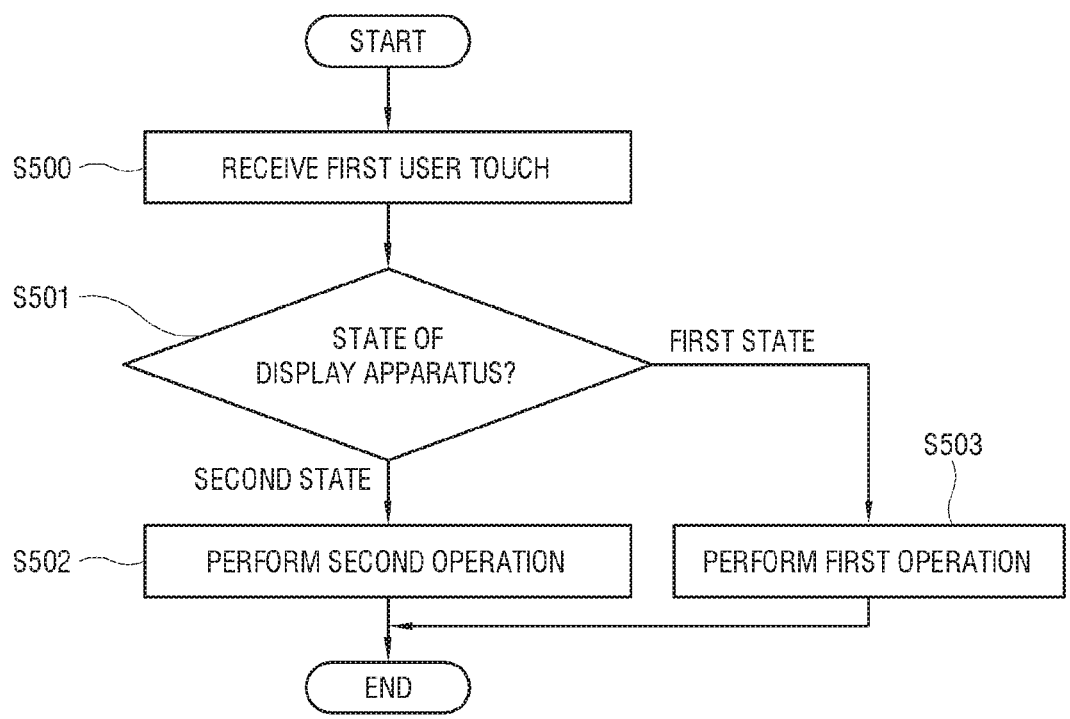
FIG. 5 is a flowchart showing operations of a display apparatus according to an embodiment of the disclosure.

FIG. 5 is a flowchart showing operations of the controller 210 according to an embodiment of the disclosure. First, the controller 210 identifies whether a user's first touch input is received in the touch receiver 220 (S500). Further, when it is identified that the first touch input is received, the controller 210 identifies the state of the display apparatus 100 through the sensor 240 during the reception of the first touch input. The state of the display apparatus 100 is identified based on the sensor 240 (S501). The state of the display apparatus 100 may include any information about the display apparatus 100, ambient situations of the display apparatus 100, and a user's positions, and the like detectable by the sensor 240. The state of the display apparatus 100 may be classified based on a specific condition, and a classification result may be stored in the storage 260. The specific condition may previously be stored in a product or may be stored and changed by a user input.

When the state of the display apparatus 100 corresponds to the specific condition (e.g. a first state in S501, hereinafter referred to as a 'first state'), the controller 210 may control a first operation to be performed corresponding to the touch input (S503). On the other hand, when the state of the display apparatus 100 does not correspond to the specific condition (e.g. a second state of S501, hereinafter referred to as a 'second state'), the controller 210 may control a second operation to be performed corresponding to a current state as an operation different from the first operation corresponding to the touch input (S502). As the states detectable by the sensor 240, the first state and the second state may be incompatible with each other, like a tilted state, a user's position, ambient brightness, etc. of the display apparatus 100, but not limited thereto. Further, there may be states other than the first state and the second state. Thus, the controller 210 may control different operations to be performed according to the states of the display apparatus 100, with respect to the same touch input.

In this flowchart, the operation S501 is performed following the operation S500. However, these two operations may be performed in reversed order. Therefore, the second operation may be performed when the first touch input is received after the sensor 240 identifies the state of the display apparatus 100 or its surrounding states. Further, the second operation may be performed even when the sensor 240 identifies the state of the display apparatus 100 during the first operation based on the first touch input.

Although only two states, i.e. the first state and the second state are described above, the state of the display apparatus 100 may include combination of the states mentioned above, or may include a state other than the first state and the second state. Thus, a user does not have to make a touch input many times to carry out various operations.

According to an alternative embodiment, in a case where the first operation is set to be performed based on the first touch input when the state of the display apparatus 100 corresponds to the preset first state, the controller 210 may control the second operation different from the first operation to be performed based on the first touch input when the state of the display apparatus 100 or its surrounding states correspond to the second state different from the first state. In this regard, details will be described with reference to FIG. 8.

Figure 6:
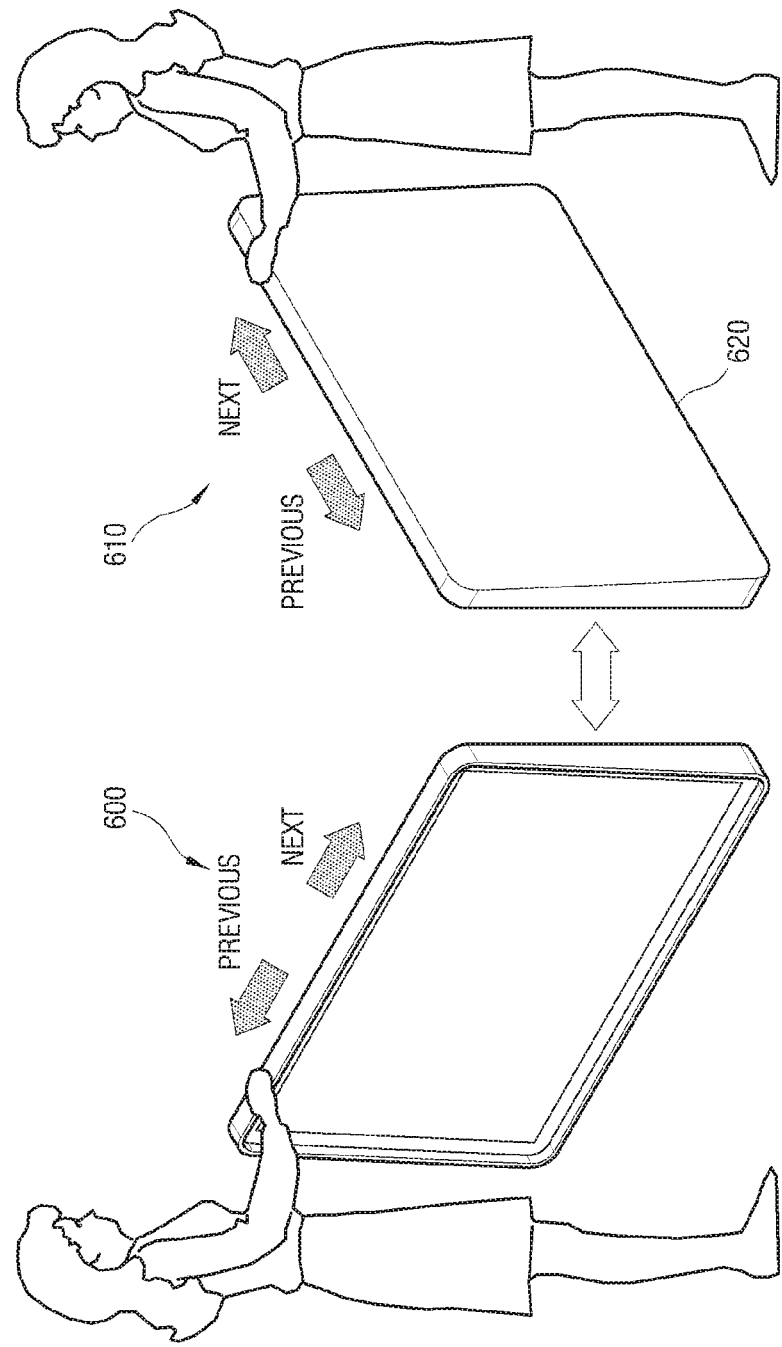
FIG. 6 illustrates an example that an operation of a display apparatus is changed based on a user's position according to an embodiment of the disclosure.

FIG. 6 illustrates the display apparatus 100 according to an embodiment of the disclosure. Referring to FIG. 6, the controller 210 sets the state detected by the sensor 240 as the first state and the second state differently according to a user's position, and controls different operations to be performed with respect to the same touch input.

The sensor 240 employs various sensors described above to identify a user's position. A user may be positioned in front of the display apparatus 100 (e.g. the first state, see '600'), and may be positioned in back of the display apparatus 100 (e.g. the second state, see '610'). First, in a case of the first state, the display apparatus may identify a touch input made leftward in a user's sight (i.e. the first touch input) as an input for an operation of reproducing previous content (i.e. the first operation), and identify a touch input made rightward (i.e. the second touch input) as an input for an operation of reproducing next content (i.e. the second operation).

A user does not always control the display apparatus 100 in the first state, but may control the display apparatus 100 in the second state. In a case where the display apparatus 100 performs an operation regardless of the state, when a touch input is made leftward in a user's sight (i.e. when a user intends to make the first touch input), the controller 210 regards the leftward touch input as the second touch input and controls the second operation to be performed. In the second state where a user performs control in back of the display apparatus 100 as indicated by the reference numeral of '610', it will become easier for the user if the control is possible like that in the first state. To this end, the display apparatus 100 may identify a user's position through the sensor 240, and perform an operation different according to the user's positions with respect to the same touch input. For example, when the touch input is made leftward by a user who is in the second state (i.e. when the user intends to make the first touch input, which is regarded as the second touch input in the display apparatus), the controller 210 may perform control to carry out the same first operation as the operation of when the touch input is made leftward by a user who is in the first state (i.e. when the user intends to make the first touch input, which is regarded as the first touch input). In result, the controller 210 may control the first operation to be equally performed even though the first touch input in the first state is different from the second touch input in the second state. The foregoing detection of the user, who is positioned in front and back of the display apparatus 100, is merely an example, and the disclosure is not limited to this example. Therefore, the controller 210 detects another position of a user through the sensor 240, and control a different operation to be performed based on the detected position with respect to the user's same touch input. Thus, it is convenient for a user to make a touch input because there are no needs of taking the user's position into account in terms of making the touch input.

Figure 7:
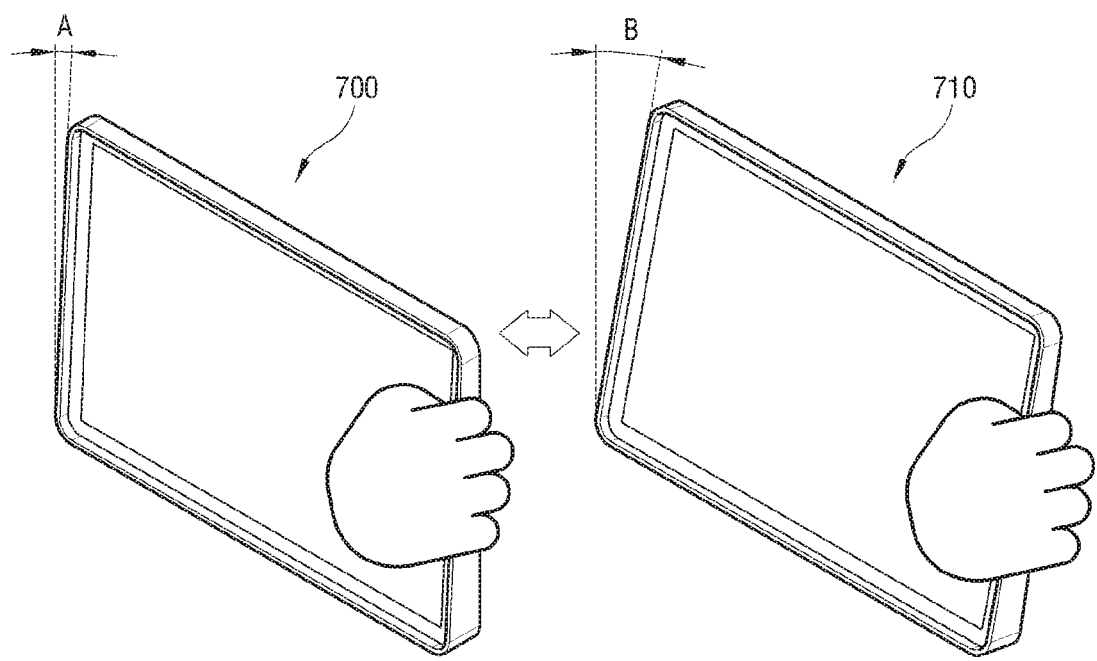
FIG. 7 illustrates an example that an operation of a display apparatus is changed based on a position state of the display apparatus according to an embodiment of the disclosure.

FIG. 7 illustrates the display apparatus 100 according to an embodiment of the disclosure. Referring to FIG. 7, it will be described that the controller 210 controls the state of the display apparatus 100 to be changed into the first state (e.g. a first posture) or the second state (e.g. a second posture) previously set according to the postures of the display apparatus 100, and controls different operations to be performed with respect to one touch input.

The bottom of the casing 310 may have two surfaces not to be flat so that the display apparatus 100 can stand upright (e.g. the first posture) or tilted (e.g. the second posture). The bottom having two surfaces is merely an example, and another method may be used to make the display apparatus 100 stand upright or tilted. The reference numeral of '700' indicates the first state in which the display apparatus 100 stands upright, and the reference numeral of '710' indicates the second state in which the display apparatus 100 stands tilted. The controller 210 identifies the posture of the display apparatus 100 through the sensor 240. When the display apparatus 100 is in the first state, the controller 210 controls the first operation to be performed based on a user's first touch input received in the touch receiver 220. When the display apparatus 100 is in the second state, it may be convenient for a user that the display apparatus performs an operation corresponding to the second state because the second state is based on a special intention of the user. Therefore, the sensor 240 detects the posture of the display apparatus 100, and the controller identifies the state of the detected posture and controls the second operation to be performed without performing the first operation based on the first touch input even though the first touch input is received in the touch receiver 220. For example, the controller 210 may control an operation such as play and stop in response to the first touch input in the first posture, but may control an operation such as play of another predetermined content in response to the first touch input in the second posture. The foregoing postures of the display apparatus 100 are merely an example, and an embodiment of the disclosure is not limited to this example. The sensor 240 may detect any possible postures of the display apparatus 100, in which the display apparatus 100 may be tilted, laid down, put upside down, stands, etc. unlike the first posture or the second posture, and the controller 210 may control an operation, which is different from the first operation based on the first touch input, to be performed based on the first touch input in each state of the postures even though the same first touch input is received. Thus, it is easy for a user to control the display apparatus 100 under a situation corresponding to a specific condition.

Figure 8:
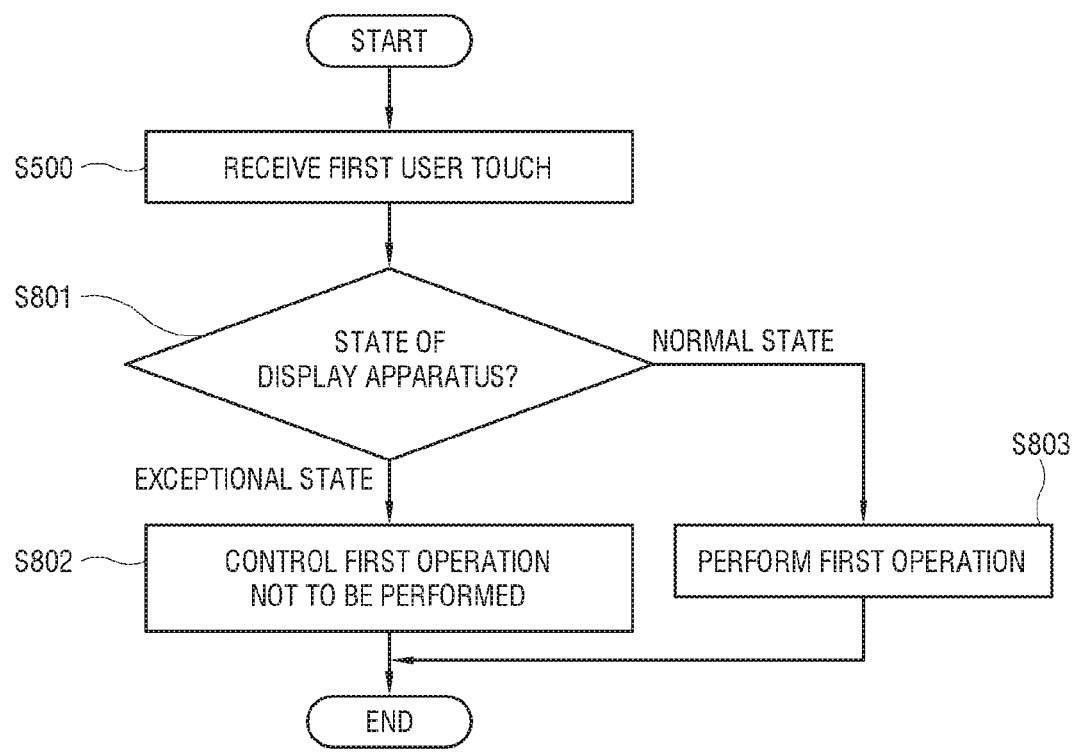
FIG. 8 is a flowchart showing operations of a display apparatus according to an embodiment of the disclosure.

FIG. 8 is a flowchart showing operations of the controller 210 according to an embodiment of the disclosure. The operation of the controller 100 shown in FIG. 8 will be described avoiding repetitive descriptions about the same or similar features to the operations described with reference to FIG. 5. Descriptions about an operation S500 shown in FIG. 8 are replaced by the descriptions about the operation S500 shown in FIG. 5.

When the state of the display apparatus 100 or the surrounding states of the display apparatus 100 detected by the sensor 240 correspond to a state under a condition usable for a user (e.g. a normal state in S801, hereinafter referred to as a 'normal state'), the controller 210 controls the first operation to be performed based on the first touch input (S803). On the other hand, when the state of the display apparatus 100 or the surrounding states of the display apparatus 100 correspond to a state under a condition that a user does not intend to make a touch input (e.g. an exceptional state, hereinafter referred to as an 'exceptional state'), the controller 210 may control the first operation not to be performed (S802). The normal state and the exceptional state may be classified according to the states detectable by the sensor 240, and the classification results may have been stored in the storage 260 and may be stored and changed by a user input.

In this flowchart, the operation S801 is performed following the operation S500. However, these two operations may be performed in reversed order. Therefore, the first operation may be controlled not to be performed even when the first touch input is received after the sensor 240 identifies the state of the display apparatus. Further, the first operation may be controlled not to be performed even when the sensor 240 detects the state of the display apparatus or the surrounding states of the display apparatus while the first operation is performed based on the first touch input. Thus, a touch input is not additionally made with regard to an unnecessary operation corresponding to an unintended touch input of a user.

Figure 9:
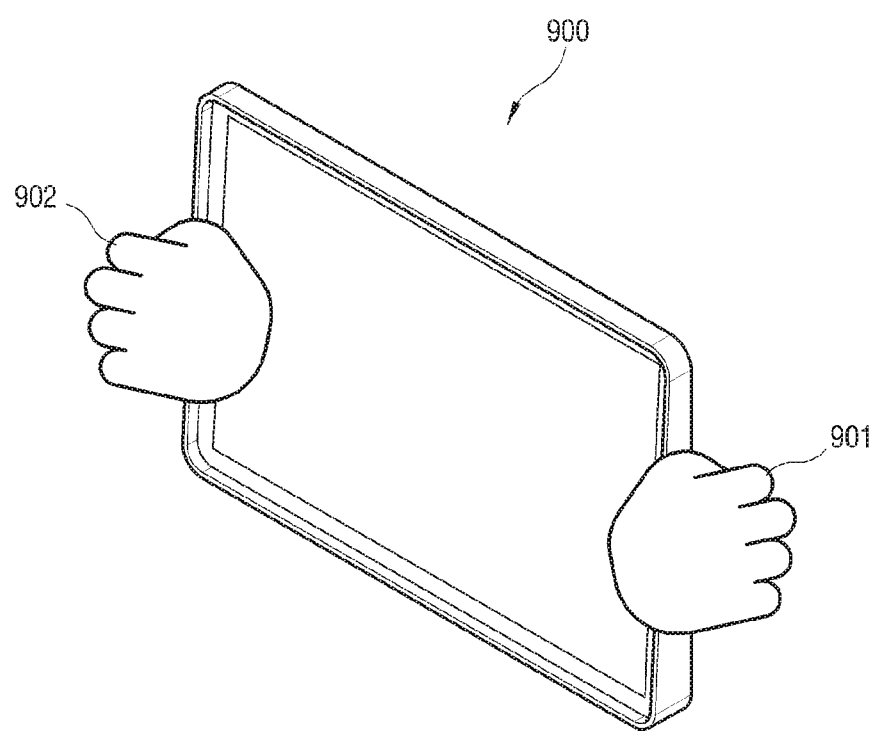
FIG. 9 illustrates an example that an operation of a display apparatus is changed based on a user touch input according to an embodiment of the disclosure.

In FIG. 9, when a first touch input 901 and a second touch input 902 are identified as the first touch input, and movement more than predetermined quantity is identified by identifying the detected state of the display apparatus 100, the controller 210 may control the first operation not to be performed based on the first touch input. This is because the touch input may be unintentionally made by a user. For instance, a user may hold the casing 310 with two hands 901 and 902 in a state that the display apparatus 100 is being powered on, and move the position of the display apparatus 100. While the display apparatus 100 is turned on, the touch receiver 220 may receive a user touch input and thus receive touch inputs based on the user's two hands 901 and 902 holding the casing 310. As the touch receiver 220 receives the touch inputs based on the user's two hands 901 and 902 holding the casing 310, the controller 210 may control the operation unintended by the user not to be performed. For example, when the touch receiver 220 receives a touch input not stored in the storage or an exceptional touch input, the controller 210 controls an operation not to be performed even though the touch input is received. Thus, the display apparatus 100 does not carry out an operation undesired by a user even when the user moves the display apparatus 100 while holding the casing 310 of the turned-on display apparatus 100. The movement of the display apparatus 100 is given by way of example of one among the states in which the controller 210 controls the operation not to be performed. Besides the movement, an abnormally large number of touch inputs and the like states may be subjected to this control. Thus, the operation is not carried out according to situations, and it is therefore easy for a user to use the display apparatus 100.

Figure 10:
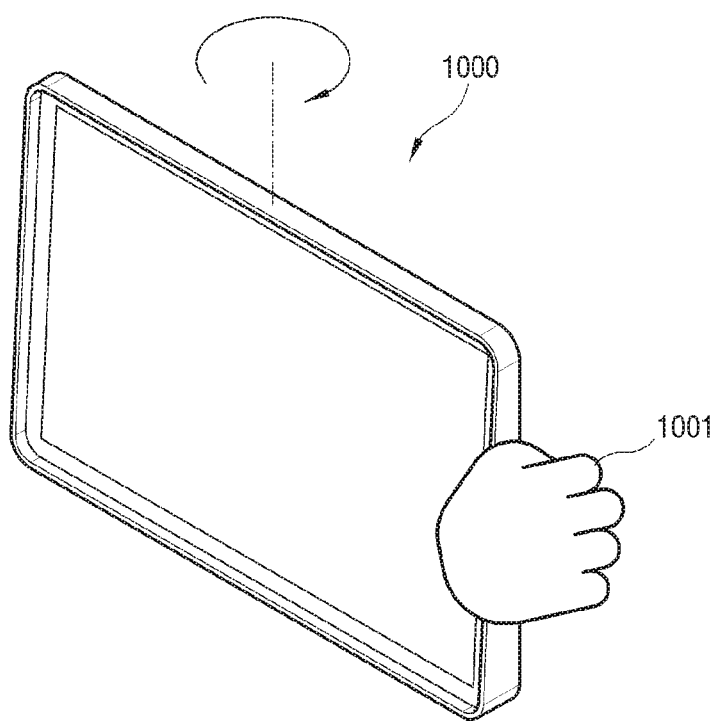
FIG. 10 illustrates an example that an operation of a display apparatus is changed based on a user touch input and a position state of the display apparatus according to an embodiment of the disclosure.

FIG. 10 illustrates the display apparatus 100 according to an embodiment of the disclosure. In terms of describing the display apparatus 100 shown in FIG. 10, repetitive descriptions about the same or similar features to those of the display apparatus 100 described with reference to FIG. 9 will be avoided. As indicated by the reference numeral of '1000', a user may move or rotate the display apparatus 100 while holding the casing 310 of the display apparatus 100. In this case, a user holds the casing 310 of the display apparatus 100 in order to not make a touch input but move or rotate the display apparatus 100, the controller 210 needs to control an operation not to be performed based on the touch input. When the sensor 240 detects a position change or the like movement more than predetermined quantity (or change in surrounding states) while the touch receiver 220 receives a touch input 1001, the controller 210 may control an operation not to be performed based on the touch input 1001. Thus, the display apparatus 100 does not carry out an operation based on the touch input 1001, which is not intended by a user to control the display apparatus 100, and is therefore convenient for a user.

Figure 11:
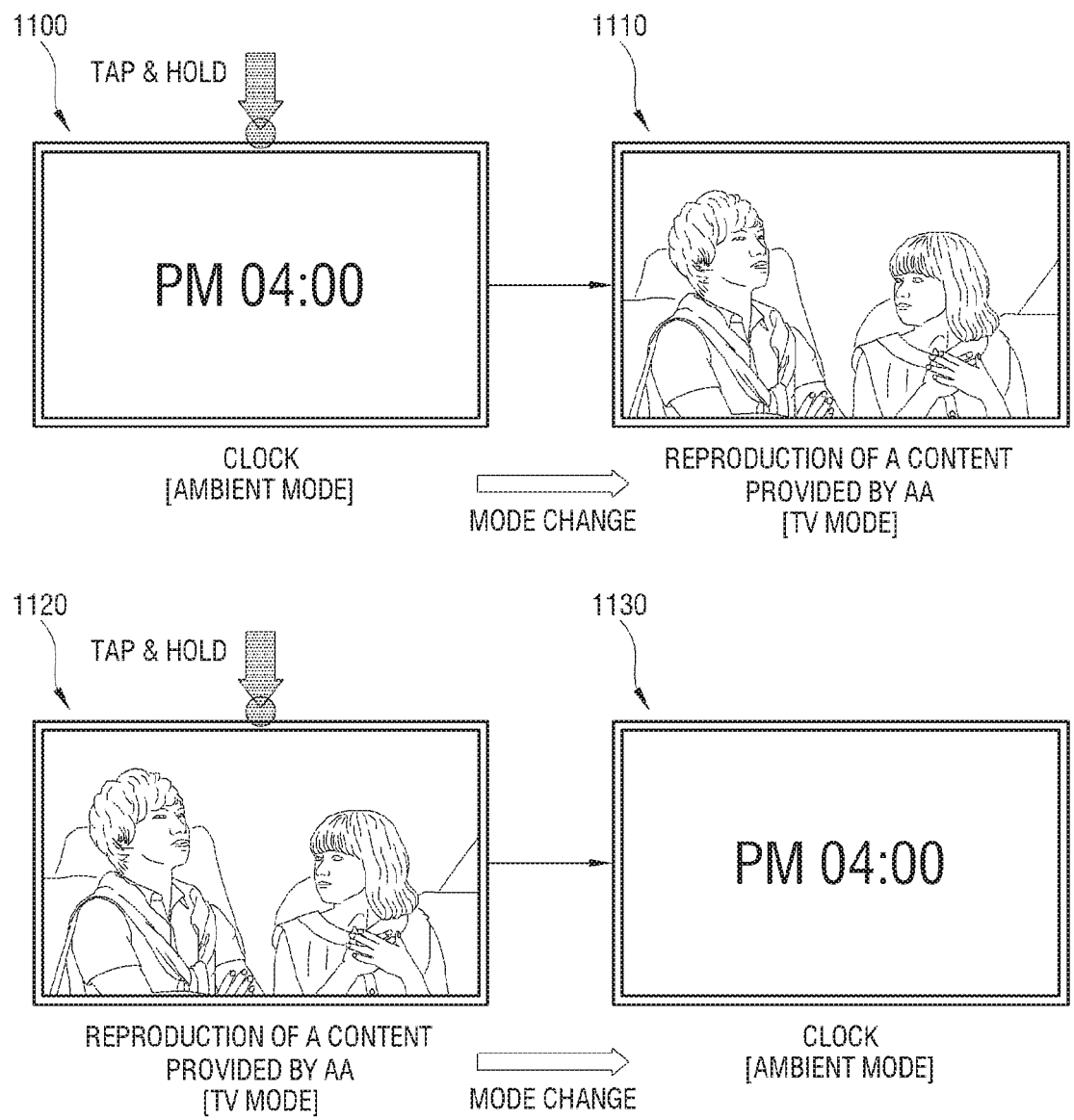
FIG. 11 illustrates an example that an operation of a display apparatus is changed based on the kind of user touch input according to an embodiment of the disclosure.

FIG. 11 illustrates an example that an operation of a display apparatus is changed based on the kind of user touch input according to an embodiment of the disclosure. Referring FIG. 11, it will be described that a mode is changed based on the tap & hold action described above. An ambient mode refers to modes for content other than content of a TV mode. The TV mode and the ambient mode are merely given for convenience of description. Alternatively, other modes may be changed.

As indicated by the reference numeral of '1100' in FIG. 11, the current state is in an ambient mode of displaying a clock. The controller 210 may control the ambient mode to be changed into the TV mode based on a user touch input. Various touch inputs are possible as the user touch input. In this case, the mode change may be achieved by a tap & hold touch input. A user taps the casing 310 and holds contact with the casing 310 in order to do the tap & hold action. When a user makes a touch input by the tap & hold action, the touch receiver 220 receives the touch input and the controller 210 performs an operation based on the touch input. When a user takes the tap & hold action, the controller 210 may control the mode of the display apparatus 100 from the ambient mode to the TV mode as indicated by the reference numeral of '1110'. On the other hand, when a user takes the tap & hold action in the state that the display apparatus 100 is in the TV mode as indicated by the reference numeral of '1120', the controller 210 may control the mode of the display apparatus 100 from the TV mode to the ambient mode as indicated by the reference numeral of '1130'. The TV mode and the ambient mode are merely given by way of example, and the disclosure is not limited to the embodiment shown in FIG. 11. For instance, when the display apparatus 100 has other modes, change between these modes may be performed as set by a user.

Figure 12:
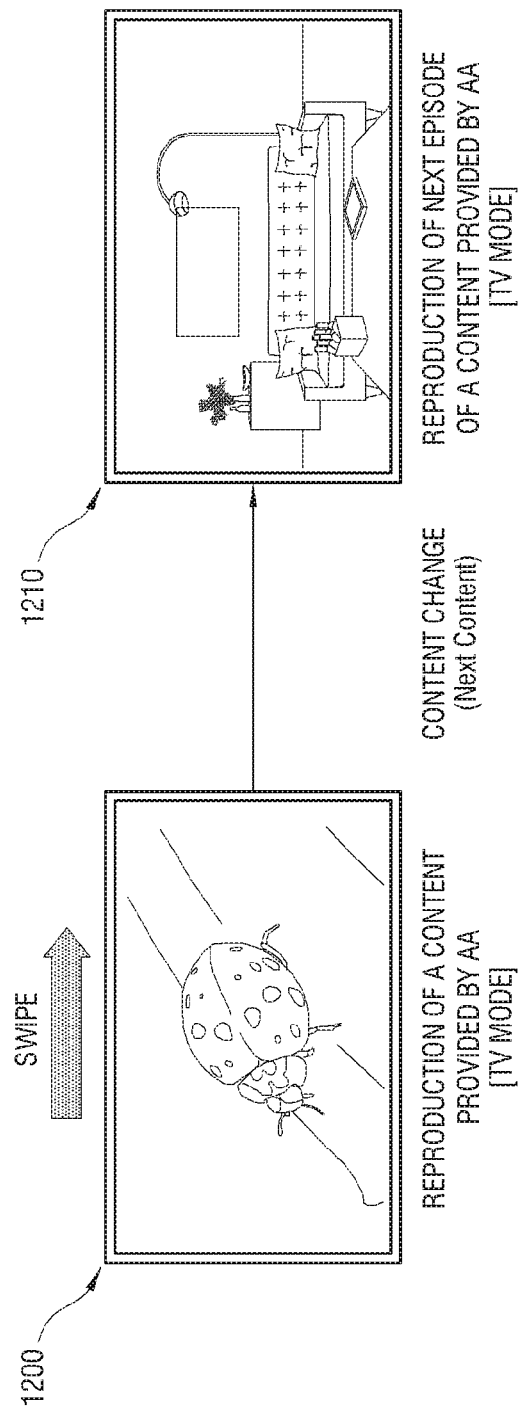
FIG. 12 illustrates an example that an operation of a display apparatus is changed based on the kind of user touch input according to an embodiment of the disclosure.

FIG. 12 illustrates an example that an operation of a display apparatus is changed based on the kind of user touch input according to an embodiment of the disclosure. While the display apparatus 100 is outputting content or doing calculation for the output, a user may take a swipe action to change content under the same menu. The swipe action refers to a type of touch input, as a touch like a wipe given to the casing 310 in a certain direction. The direction of the swipe action is not restricted, and a user can freely take the swipe action as long as it is possible to touch the casing 310. The controller 210 may control content to be changed based on a touch input of the swipe action received in the touch receiver 220. For instance, when a user stands looking squarely at the display 300 of the display apparatus 100 and swipes the top portion 301 from left to right, the controller 210 may control content being currently reproduced to be switched over to content to be reproduced next or the next order of content as indicated by the reference numeral of '1200'. On the other hand, when a swipe is taken from right to left, the controller 210 may perform control to return to the beginning of the content being currently reproduced or switch over from the content being currently reproduced to previous content. The swipe action is applicable to any portion of the casing 310 as well as the top portion 301, and the controller 210 may control an operation to be performed based on a corresponding swipe touch input.

Figure 13:
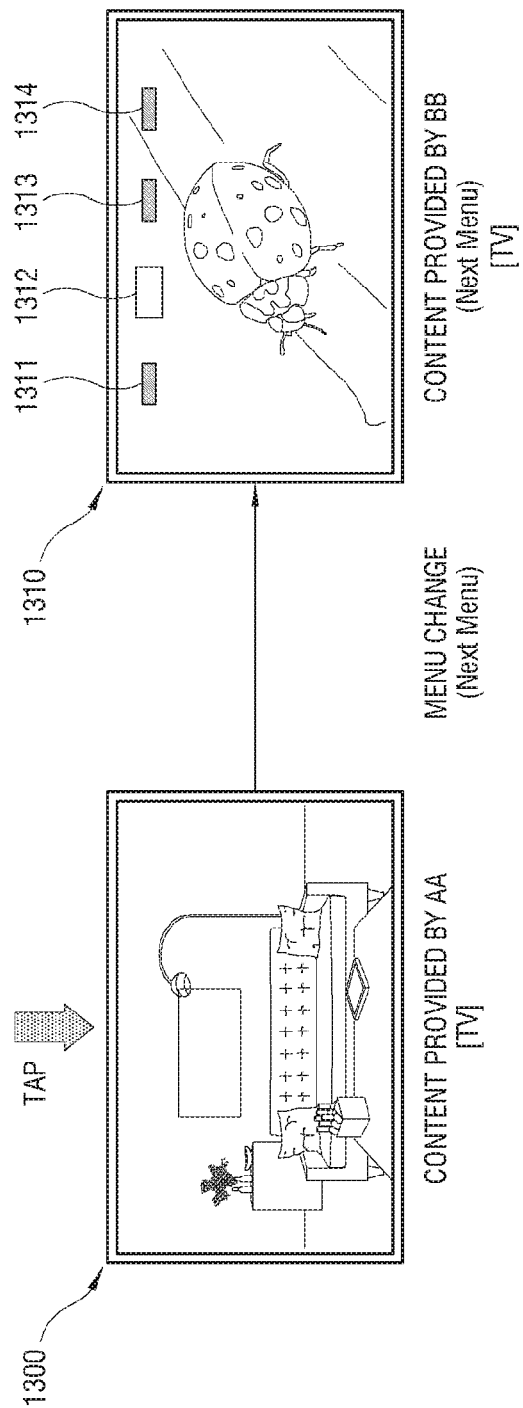
FIG. 13 illustrates an example that an operation of a display apparatus is changed based on the kind of user touch input according to an embodiment of the disclosure.

FIG. 13 illustrates an example that an operation of a display apparatus is changed based on the kind of user touch input according to an embodiment of the disclosure. While the display apparatus 100 is outputting content or doing calculation for the output, a user may take a tap action to move in a menu. The tap action refers to a type of touch input, as a touch like hitting the casing 310 once. The number of times of the tap action is not restricted, and a user can freely take the tap action as long as it is possible to touch the casing 310. The controller 210 may control a menu to be changed based on a touch input of the tap action received in the touch receiver 220. For instance, when a user stands looking squarely at the display 300 of the display apparatus 100 and taps the top portion 301, the controller 210 may control to move to a next menu like a change from the reference numeral of '1300' to the reference numeral of '1310'. The tap action is applicable to any portion of the casing 310 as well as the top portion 301, and the controller 210 may control an operation to be performed based on a corresponding tap. On the image displayed by the display 100, bars 1311, 1312, 1313 and 1314 respectively indicate menus, and a white bar 1312 indicates that a current menu is the second menu. A menu AA before a tap is the first menu, and a menu BB after the tap is the second menu.

Figure 14:
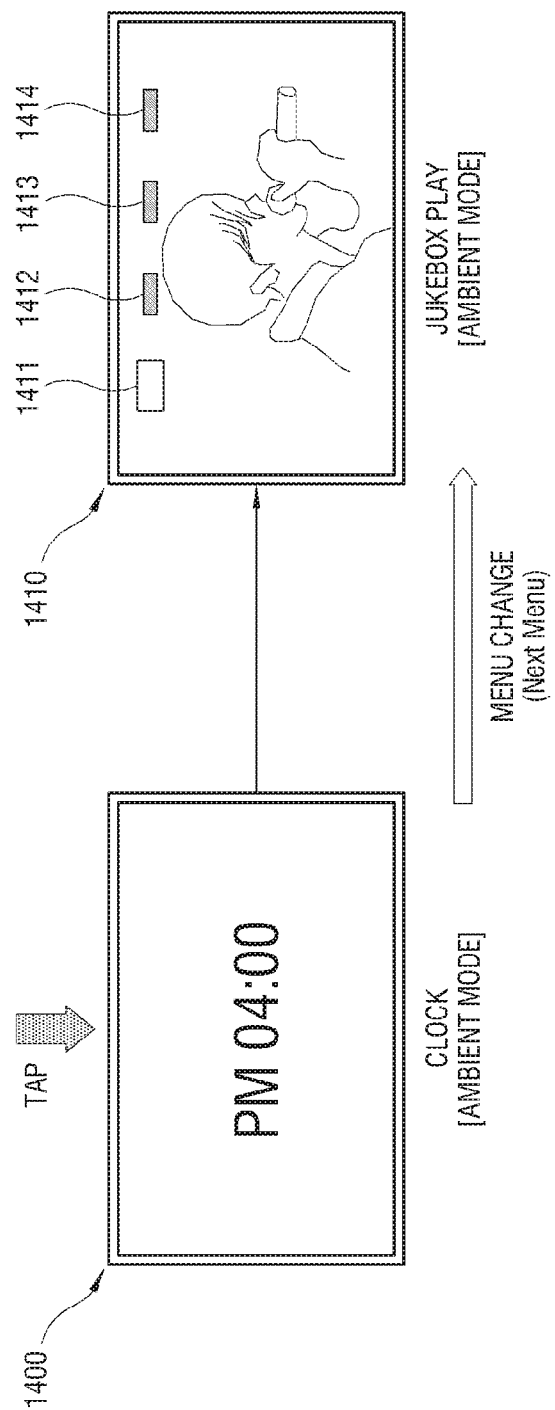
FIG. 14 illustrates an example that an operation of a display apparatus is changed based on the kind of user touch input according to an embodiment of the disclosure.

FIG. 14 illustrates an example that an operation of a display apparatus is changed based on the kind of user touch input according to an embodiment of the disclosure. Like FIG. 13, a menu of FIG. 14 is changed based on the top operation. However, the menu change of FIG. 13 is performed in the TV mode, but the menu change of FIG. 14 is performed in the ambient mode. In a current ambient mode, content is a clock. When the touch receiver 220 receives a tap action while the display apparatus 100 is displaying the clock in the ambient mode, the controller 210 controls the clock to be switched over to the next menu of a jukebox. The tap action is applicable to any portion of the casing 310. An image displayed on the display 300 as indicated by the reference numeral of '1410' is an execution image of the jukebox. On the image displayed by the display 100, bars 1411, 1412, 1413 and 1414 displayed in an upper portion of the display 300 respectively indicate menus, and a white bar 1412 indicates that a menu being currently executed is the first menu. A user may change the ambient mode to the next menu through the tap action.

Figure 15:
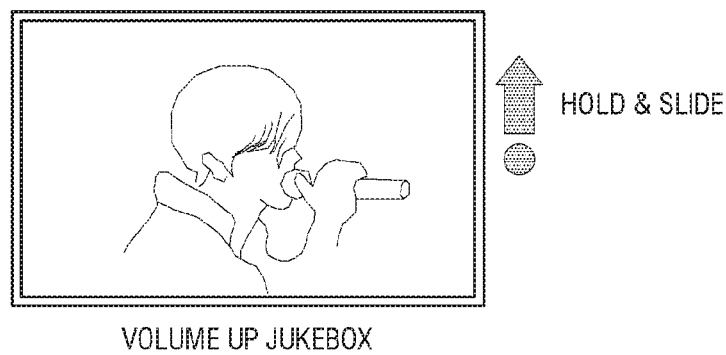
FIG. 15 illustrates an example that an operation of a display apparatus is changed based on the kind of user touch input according to an embodiment of the disclosure.

FIG. 15 illustrates an example that an operation of a display apparatus is changed based on the kind of user touch input according to an embodiment of the disclosure. While the display apparatus 100 is outputting a sound or doing calculation for the output, a user may take a hold & slide action to control the volume of the output sound. The hold & slide action refers to a type of touch input, as movement while keeping contact with the casing 310 after a user applies the tap & hold action to the casing 310. A user can freely take the hold & slide action as long as it is possible to touch the casing 310. The controller 210 may perform volume control of a sound based on a hold & slide touch input received in the touch receiver 220. For instance, a user may turn the volume up by sliding the touch up after the tap & hold action, and turn the volume down by sliding the touch down after the tap & hold action. The hold & slide action may be generally used in the left portion 302 and the right portion 303, but not limited thereto.

Figure 16:
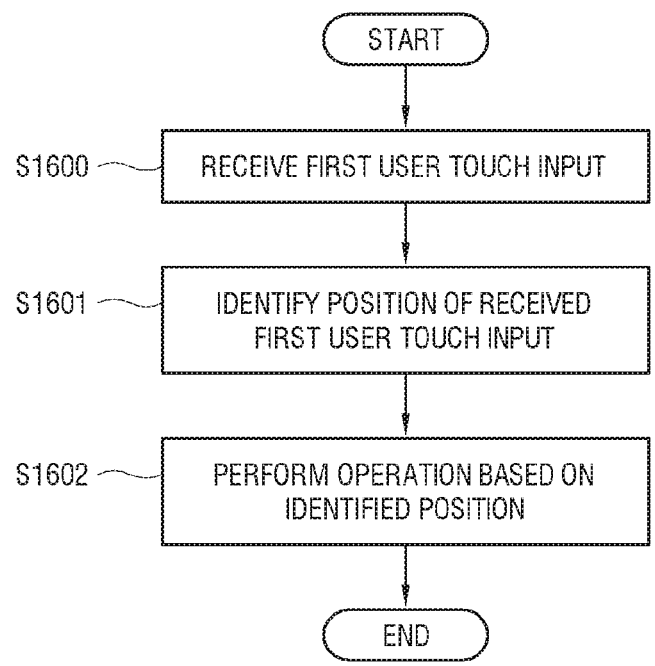
FIG. 16 is a flowchart showing operations of a display apparatus according to an embodiment of the disclosure.
Figure 17:
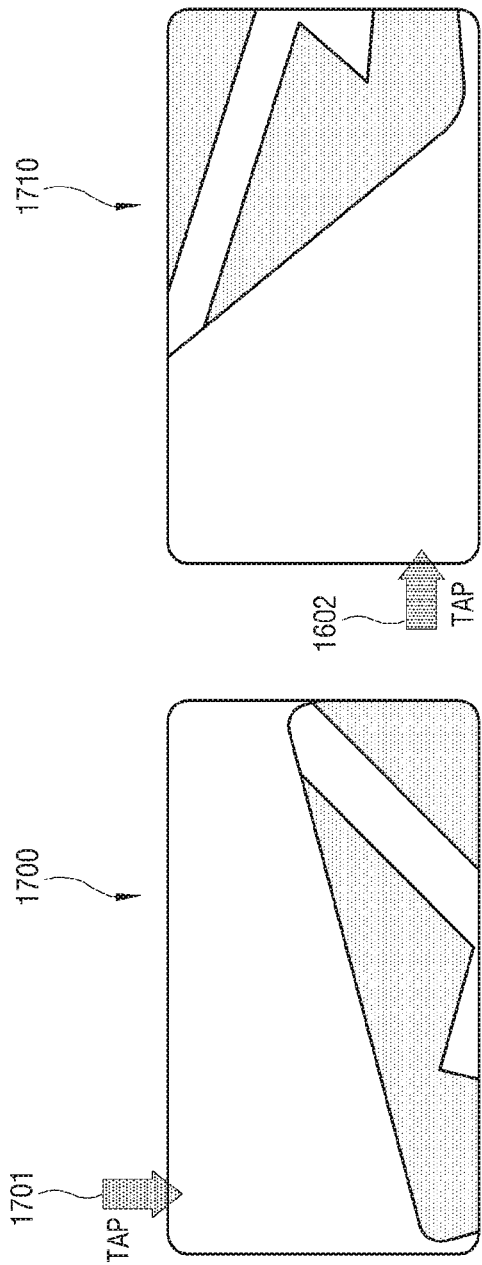
FIG. 17 illustrates an example that an operation of a display apparatus is changed based on a position of a user touch input according to an embodiment of the disclosure.

FIG. 16 is a flowchart showing another example of operations in a display apparatus 100 according to an embodiment of the disclosure. The controller 210 controls the touch receiver 220 to receive a user touch input (S1600). The controller 210 controls the touch receiver 220 to identify a position of the received touch input (S1601). The controller 210 may perform control to identify where the touch input is made in the casing 310. The controller 210 controls an operation to be performed based on the touch input and a direction corresponding to the identified position of the touch input (S1602). Referring to FIG. 17, operations will be described. The reference numeral of '1700' indicates that a touch input 1701 is received in the top portion 301 of the display 300 in the casing 310. As an example of describing the embodiment of the disclosure, it will be assumed that the kind of touch input 1701 is a tap action and the controller 210 performs an operation of jumping to the next content based on the tap action. Under general operation situations, when a user applies the tap action to any portion of the casing 310, the display apparatus 100 performs the same operation with regard to the tap action. In result, it is impossible to identify where a user applies the tap action, and whether the touch receiver 220 properly receives a position tapped by the user even though the display apparatus 100 performs an operation based on the tap action. Accordingly, the controller 210 identifies a position to which the tap action is applied, and controls an operation to be performed in a direction corresponding to the identified position, thereby allowing a user to check whether the touch receiver 220 receives the user's tap action. For example, when jumping to an operation corresponding to a tap action, i.e. the next content, the controller 210 may control a screen change effect to be varied depending on the tapped position. Referring to the reference numeral of '1700' in FIG. 17, an example will be described. As indicated by the reference numeral of '1700', when a tap action 1701 is received at a left position in the top portion 301 of the display 300, the controller 210 controls the screen change effect for an operation of jumping to the next content based on the tap action 1701 to start from the position to which the tap action 1701 is applied. On the assumption that the tap action in the top portion 301 has an effect on making a screen before the change disappear in a downward direction, when the tap action 1701 is applied at the left position in the top portion 301, the controller 210 controls the screen change effect to be performed in an inclined state that the screen before the change falls at a left side first. Referring to the reference numeral of '1710' in FIG. 17, an additional example will be described. As indicated by the reference numeral of '1710', when a tap action 1711 is received at a lower position in the left portion 302, the controller 210 controls the screen change effect for the operation of jumping to the next content based on the tap action 1711 to start from the position, to which the tap action 1711 is applied. On the assumption that the tap action in the left portion 302 has an effect on making a screen before the change disappear in a rightward direction, when the tap action 1711 is applied at the lower position in the left portion 302, the controller 210 controls the screen change effect to be performed in a state that the screen before the change is pushed rightward at a lower side first. The screen change effect according to the disclosure is not limited to the disappearing effect. The disclosure may be applied to any screen change effect as long as the controller 210 controls the screen change effect to start from a position at which a user touch input is received. Thus, a user can intuitively perceive whether an operation performed by the display apparatus is based on a user touch input.

Figure 18:
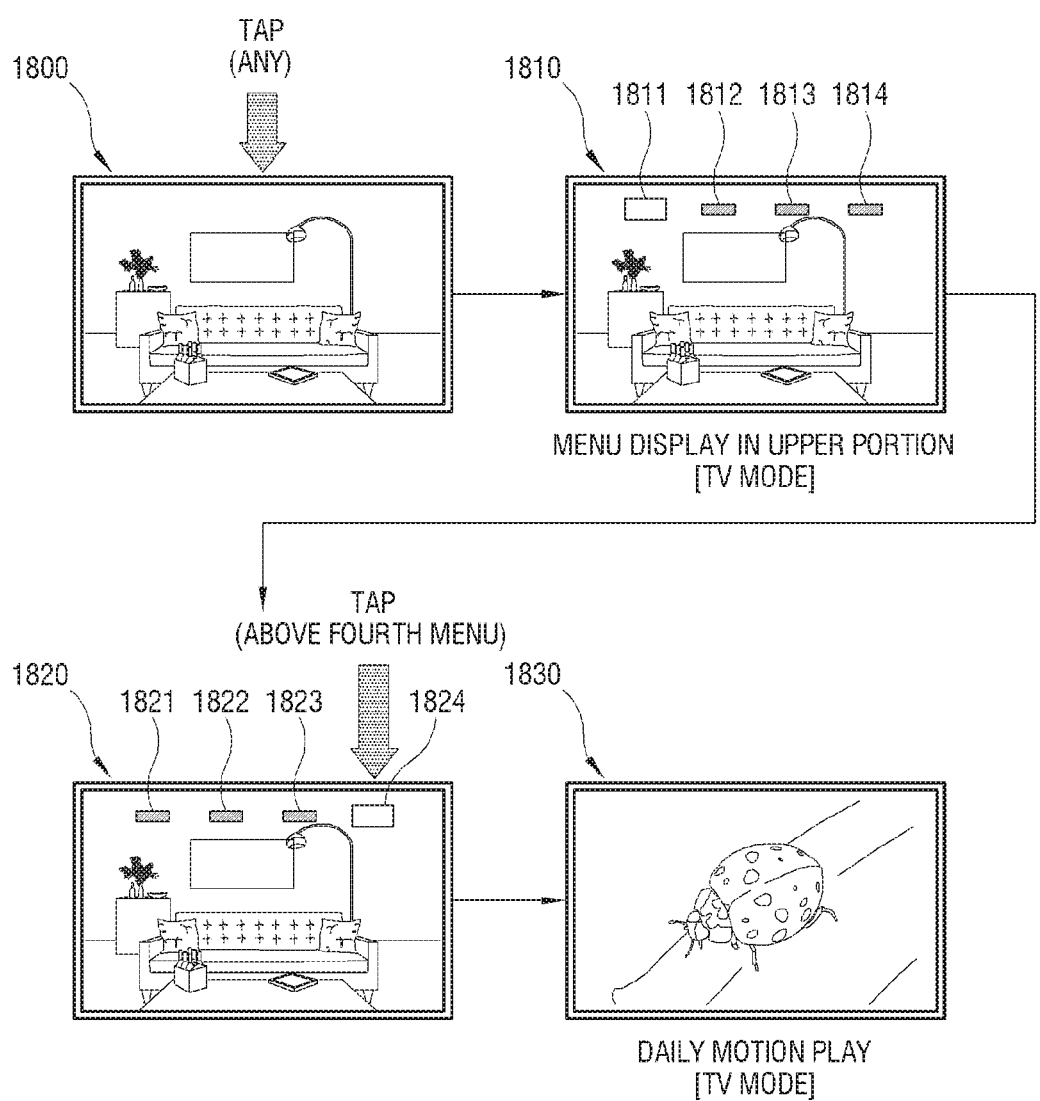
FIG. 18 illustrates an example that an operation of a display apparatus is changed based on the kind of user touch input according to an embodiment of the disclosure.

FIG. 18 illustrates an example that different operations of a display apparatus are performed with respect to one touch input of a user according to an embodiment of the disclosure. When a user taps the casing 310, bars 1811, 1812, 1813 and 1814 corresponding to a menu are displayed on the display 300. A white bar 1811 indicates that a current menu is the first menu. When a user taps the casing 310 at a position on the screen corresponding to one bar among the bars 1811, 1812, 1813 and 1814, the corresponding menu is selected. The fourth bar 1814 from the left corresponds to the fourth menu. When a user taps a specific position in the top portion 301 above the fourth bar 1824, the controller 210 controls the fourth bar to be selected like the white bar 1824. Then, the controller 210 controls content corresponding to the fourth menu to be executed as indicated by the reference numeral of '1830'. FIG. 18 illustrates that the bars 1811, 1812, 1813 and 1814 are positioned in an upper portion of the display 300, but this is merely an embodiment of the disclosure. Alternatively, the bars may be positioned in other portions of the display 300. Further, not only the top portion 301 but also other portions 302, 303 and 304 of the casing 310 may be tapped for selection. Thus, a user can easily control the display apparatus 100 without inconveniently making a touch input many times.

Figure 19:
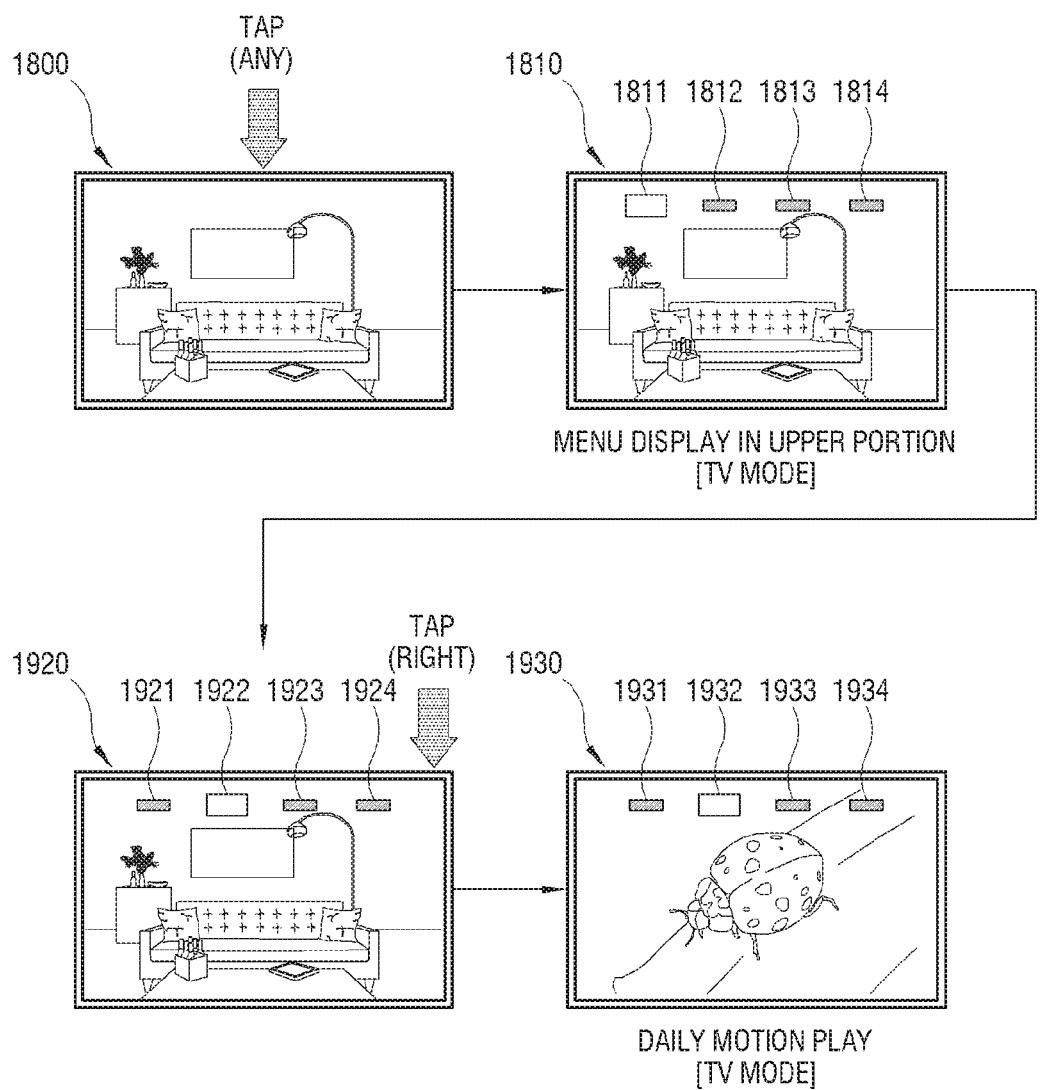
FIG. 19 illustrates an example that an operation of a display apparatus is changed based on the kind of user touch input according to an embodiment of the disclosure.

FIG. 19 illustrates an example that an operation of a display apparatus is changed based on the kind of user touch input according to an embodiment of the disclosure. In FIG. 19, repetitive descriptions about the same or similar features to those described with reference to FIG. 18 will be avoided. A user may tap the top portion 301 corresponding to a portion out of bars 1811, 1812, 1813 and 1814. When the tap action is applied, the controller 210 may perform control to select the next menu, unlike the operation based on the tap action as described above with reference to FIG. 18. In result, the controller 210 may control selection to be changed from the first menu 1811 to the second menu 1922. The controller 210 may perform control to move to the selected second menu 1932 as indicated by the reference numeral of '1930'. As described with reference to FIG. 18, the bars may not be positioned only in the top portion of the display 300, and not only the top portion 301 but also any portions of the casing 310 may be tapped for selection.

Figure 20:
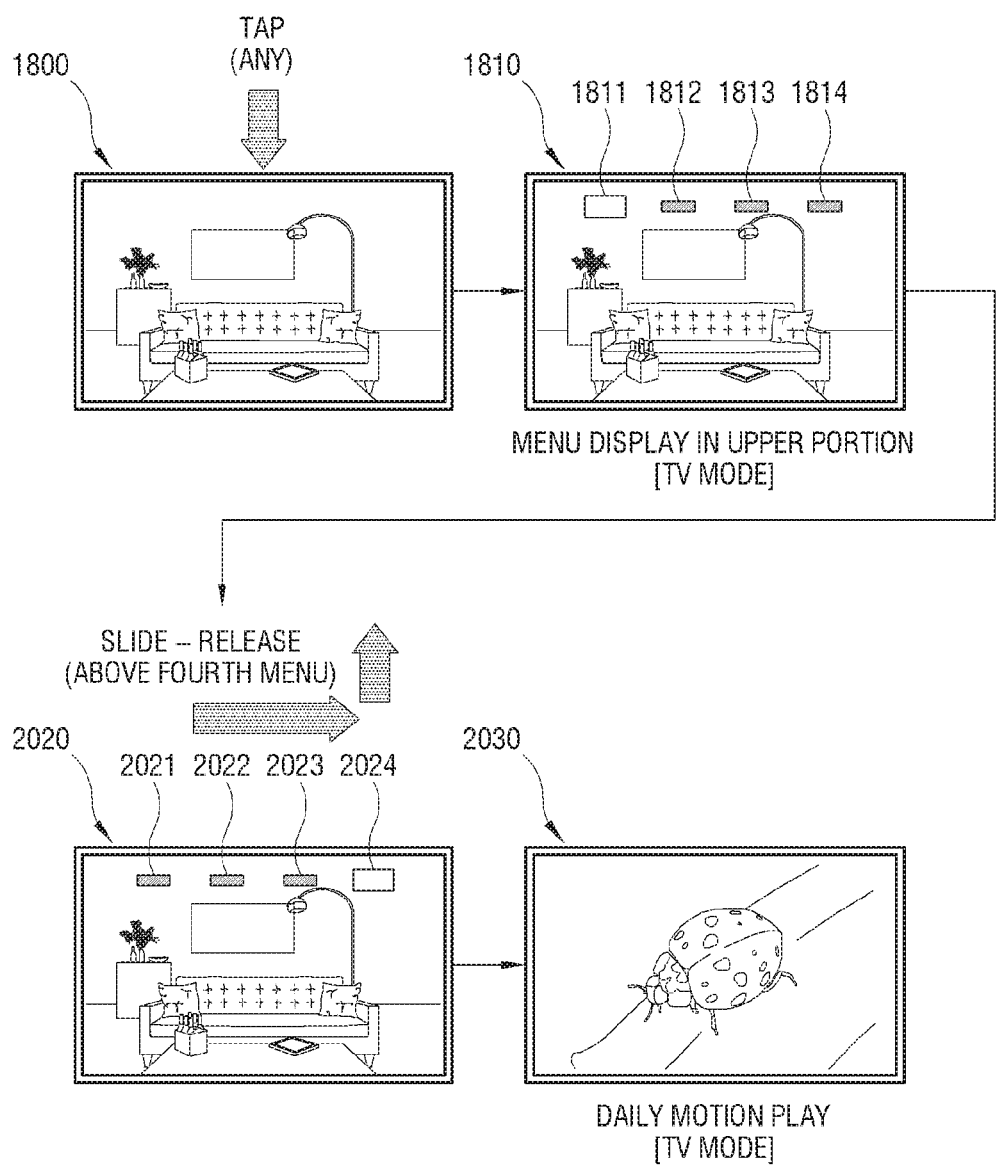
FIG. 20 illustrates an example that an operation of a display apparatus is changed based on the kind of user touch input according to an embodiment of the disclosure.

FIG. 20 illustrates an example that an operation of a display apparatus is changed based on the kind of user touch input according to an embodiment of the disclosure. In FIG. 20, repetitive descriptions about the same or similar features to those described with reference to FIG. 18 will be avoided. When a user takes a tap action, the controller 210 may control selectable menus to be displayed as bars 1811, 1812, 1813 and 1814 on the display 300. A user may take a slide action to release a touch from a specific position in the top portion 301 corresponding to a bar 2024 for the fourth menu. In result, the controller 210 may control the fourth bar 2024 to be selected, and perform control to move to content corresponding to the fourth menu as indicated by the reference numeral of '2030'. Thus, an operation desired by a user can be carried out through the user's minimal touch input.

What is claimed is:

1. A display apparatus comprising:
a display comprising a screen;
a touch receiver configured to receive a user touch input;
a sensor configured to detect a position of a user;
a casing provided around the display and accommodating the touch receiver, the casing including a plurality of portions; and
a processor configured to:
 detect the user touch input including a swipe action moving from a first portion among the plurality of portions,
 identify whether the swipe action moves to a second portion or a third portion among the plurality of portions, wherein the second portion and the third portion are on either side of the first portion,
 identify the position of the user by the sensor,
 based on identifying that the swipe action moves to the second portion and the user is in a first position in front of the display apparatus, perform a first operation,
 based on identifying that the swipe action moves to the third portion and the user is in the first position, perform a second operation, and
 based on identifying that the swipe action moves to the third portion and the user is in a second position in back of the display apparatus, perform the first operation.

2. The display apparatus according to claim 1, wherein the sensor is configured to detect change in a posture of the display apparatus, and
the processor is configured to perform the second operation based on a second posture different from a first posture of the display apparatus corresponding to the first operation.

3. The display apparatus according to claim 1, wherein the processor is configured to prevent the first operation or the second operation from being performed, based on a detected state of the display apparatus.

4. The display apparatus according to claim 3, wherein the sensor is configured to detect movement of the display apparatus, and
the processor is configured to prevent the first operation or the second operation from being performed based on the display apparatus being moved more than a predetermined quantity.

5. A method of controlling a display apparatus, the method comprising:
detecting a user touch input including a swipe action moving from a first portion among a plurality of portions of a casing which is provided around a display having a screen;
identifying whether the swipe action moves to a second portion or a third portion among the plurality of portions, wherein the second portion and the third portion are on either side of the first portion;

identifying a position of a user;
based on identifying that the swipe action moves to the second portion and the user is in a first position in front of the display apparatus, performing a first operation;
based on identifying that the swipe action moves to the third portion and the user is in the first position, performing a second operation; and
based on identifying that the swipe action moves to the third portion and the user is in a second position in back of the display apparatus, performing the first operation.

6. The method according to claim 5, further comprising:
detecting change in a posture of the display apparatus; and
performing the second operation based on a second posture different from a first posture of the display apparatus corresponding to the first operation.

7. The method according to claim 5, further comprising:
preventing the first operation or the second operation from being performed, based on a detected state of the display apparatus.

8. The method according to claim 7, further comprising:
detecting movement of the display apparatus; and
preventing the first operation or the second operation from being performed based on the display apparatus being moved more than predetermined quantity.

9. A computer program product comprising:
a memory configured to store an instruction; and
a processor configured to execute the instruction to:
   detect a user touch input including a swipe action moving from a first portion among a plurality of portions of a casing which is provided around a display having a screen,
   identify whether the swipe action moves to a second portion or a third portion among the plurality of portions, wherein the second portion and the third portion are on either side of the first portion,
   identify a position of a user,
   based on identifying that the swipe action moves to the second portion and the user is in a first position in front of the display apparatus, perform a first operation,
   based on identifying that the swipe action moves to the third portion and the user is in the first position, perform a second operation, and
   based on identifying that the swipe action moves to the third portion and the user is in a second position in back of the display apparatus, perform the first operation.

* * * * *